(12) United States Patent
Hoogenberg

(10) Patent No.: US 6,884,198 B1
(45) Date of Patent: Apr. 26, 2005

(54) CONTINUOUS VARIABLE TRANSMISSION

(75) Inventor: Heerke Hoogenberg, Rijssen (NL)

(73) Assignee: Hamapro Holding B.V., Harde (NL)

( * ) Notice: Subject to any disclaimer, the term of this patent is extended or adjusted under 35 U.S.C. 154(b) by 0 days.

(21) Appl. No.: 10/088,126

(22) PCT Filed: Aug. 25, 2000

(86) PCT No.: PCT/NL00/00594

§ 371 (c)(1),
(2), (4) Date: Aug. 2, 2002

(87) PCT Pub. No.: WO01/20193

PCT Pub. Date: Mar. 22, 2001

(30) Foreign Application Priority Data

| Sep. 15, 1999 | (NL) | .................................... 1013046 |
| Jan. 24, 2000 | (NL) | .................................... 1014153 |
| Feb. 25, 2000 | (NL) | .................................... 1014505 |

(51) Int. Cl.$^7$ ............................................. F16H 15/16
(52) U.S. Cl. .......................................... 476/51; 476/50
(58) Field of Search ............................. 476/50, 51, 52, 476/53, 72

(56) References Cited

U.S. PATENT DOCUMENTS

| 1,903,228 A | 3/1933 | Thomson ...................... 476/41 |
| 2,132,801 A | 10/1938 | Perruca ......................... 476/54 |
| 2,325,323 A | 7/1943 | Johnson et al. ................ 476/12 |
| 2,336,799 A | 12/1943 | Palm ............................. 476/11 |
| 2,478,289 A | 8/1949 | Lemon .......................... 474/20 |
| 3,802,295 A * | 4/1974 | Lemmens .................... 475/186 |
| 4,011,765 A * | 3/1977 | Tippmann ..................... 476/38 |
| 4,530,257 A * | 7/1985 | Helling et al. ................. 476/9 |
| 5,267,920 A | 12/1993 | Hibi ............................. 476/40 |
| 5,520,592 A * | 5/1996 | Rabinow ...................... 476/51 |
| 5,538,484 A * | 7/1996 | Bell ............................. 476/40 |
| 5,551,929 A * | 9/1996 | Fritsch ......................... 476/67 |
| 5,961,417 A * | 10/1999 | Schneider et al. ............ 476/53 |
| 2003/0119624 A1 * | 6/2003 | Mason et al. ................. 476/47 |

FOREIGN PATENT DOCUMENTS

| DE | 812618 | 9/1951 |
| EP | 0688407 | 12/1995 |
| FR | 608487 | 7/1926 |

* cited by examiner

*Primary Examiner*—David M. Fenstermacher
(74) *Attorney, Agent, or Firm*—Webb Ziesenheim Logsdon Orkin & Hanson, P.C.

(57) ABSTRACT

The invention relates to a mechanical transmission, comprising: a frame; an input shaft with a first friction surface, which shaft is arranged rotatably on the frame; an output shaft with a second friction surface arranged rotatably on the frame parallel to the input shaft; a rotatable body with a third and a fourth friction surface arranged at least for radial displacement on the frame between the input and output shaft; a first push belt arranged between the first and the third friction surface and co-acting therewith; and a second push belt arranged between the second and the fourth friction surface and co-acting therewith, wherein the friction surfaces are rotation-symmetrical, the friction surfaces comprise at least an axial component and at least one of the first and the third friction surface and at least one of the second and the fourth friction surface comprise a radial directional component.

16 Claims, 8 Drawing Sheets

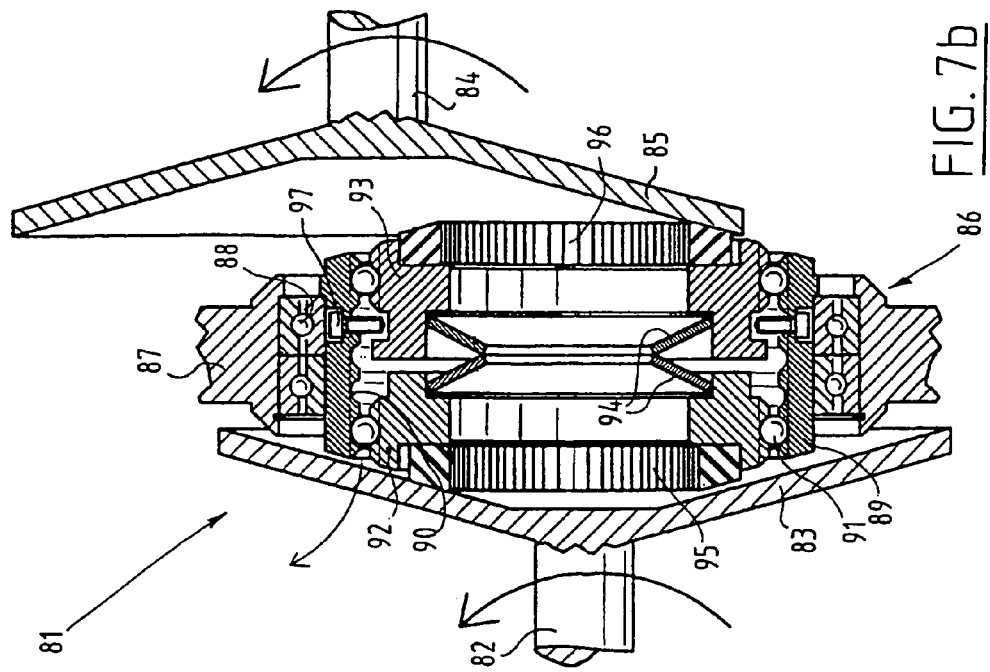
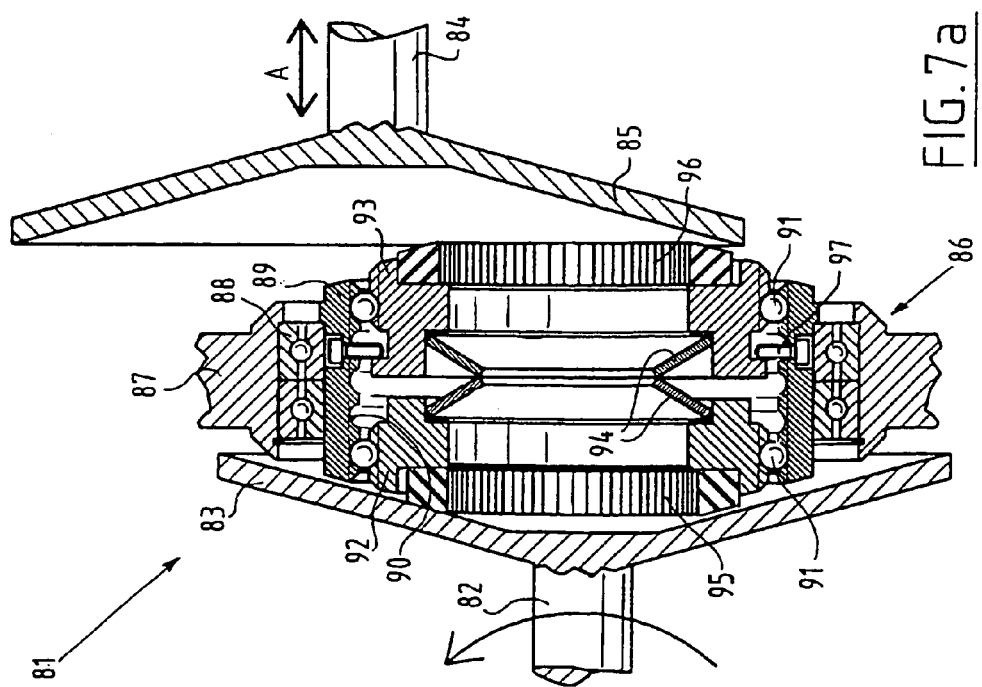

CONTINUOUS VARIABLE TRANSMISSION

BACKGROUND OF THE INVENTION

1. Field of the Invention

The invention relates to a mechanical transmission with which a fixed or variable transmission ratio can be realized between two rotating parts.

2. Description of the Related Art

The European patent no. 0 688 407 describes a mechanical transmission which comprises a frame, a first shaft arranged rotatably in the frame and a second shaft arranged rotatably in the frame, which second shaft is parallel to and eccentric relative to the first shaft. The first shaft carries a pair of conical friction wheels, between which a push belt is placed. The second shaft comprises an engaging wheel which reaches between the friction wheels and engages with the push belt. By displacing the second shaft in a direction at a right angle to the axial direction the push belt will displace between the friction wheels, whereby a different transmission ratio is realized.

A drawback of the above described transmission is that the second shaft has to be displaceable. This requires major structural measures in order to make the shaft displaceable and also to enable driving of anything with the shaft.

Another drawback is that the range of transmission ratios which can be adjusted is limited.

It is an object of the invention to obviate the above stated drawbacks. It is a further object of the invention to provide a transmission with a limited number of components.

SUMMARY OF THE INVENTION

The above stated objectives are achieved according to the invention with a transmission, comprising:
  a frame;
  an input shaft with a first friction surface, which shaft is arranged rotatably on the frame;
  an output shaft with a second friction surface arranged rotatably on the frame parallel to the input shaft;
  a rotatable body with a third and a fourth friction surface arranged at least for radial displacement on the frame between the input and output shaft;
  a first push belt arranged between the first and the third friction surface and co-acting therewith; and
  a second push belt arranged between the second and the fourth friction surface and co-acting therewith,
  wherein the friction surfaces are rotation-symmetrical, the friction surfaces comprise at least an axial component and at least one of the first and the third friction surface and at least one of the second and the fourth friction surface comprise a radial directional component.

The transmission according to the invention has the advantage that the input shaft and the output shaft are arranged fixedly in relation to each other. The transmission can hereby be arranged in simple manner in an existing drive gearing and it is not necessary to take measures for a displaceable shaft.

According to an embodiment of the transmission according to the invention the input and the output shaft each comprise a wheel with a bowl-shaped surface such that the conical surfaces form respectively the first and the second friction surface, and the body comprises on either side two wheel-shaped recesses coaxial to the rotation axis such that the cylindrical surfaces form respectively the third and the fourth friction surface.

According to yet another embodiment of the transmission according to the invention the input and the output shaft each comprise a wheel with a coaxial wheel-shaped recess such that the cylindrical surfaces of the recesses form respectively the first and the second surface, and the body comprises on either side a bowl-shaped surface such that the two conical surfaces form respectively the third and the fourth friction surface.

In a preferred embodiment of the transmission according to the invention the diameters of both wheel-shaped recesses differ from each other.

Owing to the different diameters it is possible to shift the range of transmission ratios between the input shaft and the output shaft.

In an embodiment according to the invention a stabilization part is arranged in the wheel-shaped recess, which part extends in radial direction as far as the push belt arranged in the recess.

This stabilization part ensures that the push belt cannot be pressed out of alignment. Due to the position of the point of engagement of the frictional forces on the links the push belt will tend to tilt. The push belt is hereby loaded in undesirable manner and less power can be transmitted.

In yet another embodiment of the transmission according to the invention the push belt comprises a continuous number of mutually abutting push links.

It is also possible for the push belt to comprise a continuous flexible belt.

In another preferred embodiment of the transmission according to the invention the first and second friction surfaces are identical and the third and fourth friction surfaces are identical.

The bowl-shaped surfaces are preferably conical surfaces with equal apex angles. The body can hereby progress through a linear movement.

It hereby becomes unnecessary for the shafts to be axially adjustable and, with well chosen technical provisions, a sufficient axial pressing force and a sufficient pressure force in the push belts can be obtained.

The selection of a suitable mechanism enables the magnitude of the pressing force to be made automatically subject to the moment to be transmitted.

In an embodiment at least one push belt can be manufactured according to the invention from stainless material, hard metal material or ceramic material.

When power is transmitted with the above stated transmissions, a certain amount of heat is then created in the transmission. This heat results from friction between push belt and friction surfaces. In order to achieve a longer lifespan, it is desirable to be able to cool such a transmission. Cooling preferably takes place by means of a coolant. The drawback hereof however is that many material combinations of push belt and friction surface display a considerable fall in coefficient of friction when the contact surfaces are wetted with a coolant. However, if the push belt is embodied in ceramic material, the coefficient of friction then remains virtually identical, irrespective of whether the surface is or is not cooled with a coolant such as water.

The push belt can also be embodied in stainless steel or hard metal.

An additional advantage of manufacturing the push belt links from ceramic material or sintered metal is that with this method of manufacture complicated forms can be made in simple manner.

In yet another embodiment cooling means are provided for cooling the push belts with a cooling liquid such as water.

BRIEF DESCRIPTION OF THE DRAWINGS

These and other features of the present invention are further elucidated with reference to the annexed drawings:

FIGS. 7a and 7b show a sixth embodiment according to the invention; and

DETAILED DESCRIPTION OF THE PREFERED EMBODIMENTS

Figure 1:
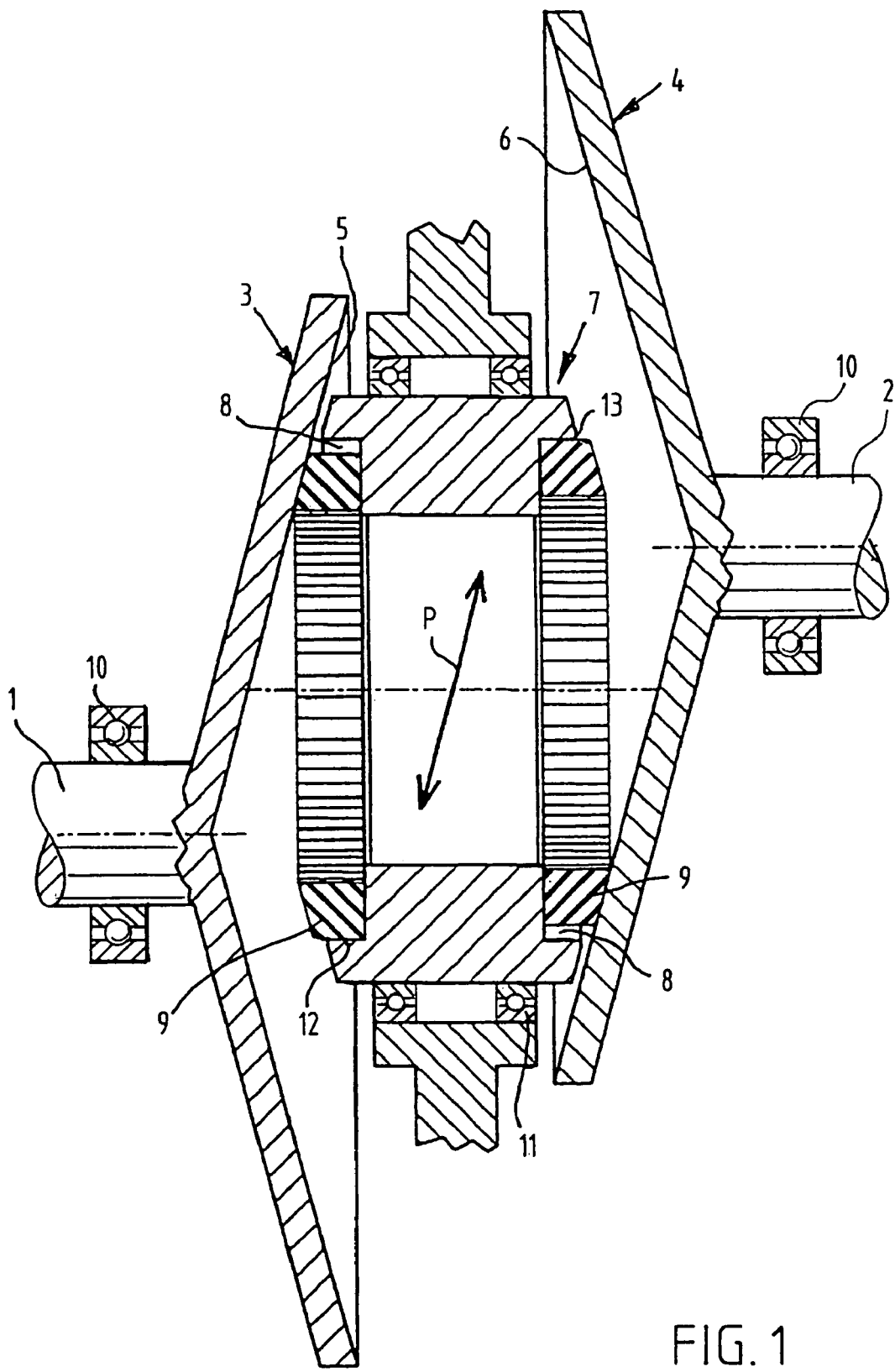
FIG. 1 shows schematically a first embodiment of a transmission according to the invention.

FIG. 1 shows schematically an input shaft 1 and an output shaft 2. A bowl-shaped wheel 3 is arranged on the input shaft and a bowl-shaped wheel 4 on the output shaft 2. Bowl-shaped wheel 3 has a first friction surface 5 and the other bowl-shaped wheel 4 has a second friction surface 6. A body 7 is arranged displaceably between bowl-shaped wheels 3, 4. This body 7 comprises on either side two wheel-shaped recesses 8 in which a push belt 9 is arranged. The peripheral surfaces of these recesses form respectively a third 12 and a fourth 13 friction surface.

Input shaft 1 and output shaft 2 are mounted in a frame (not shown) by means of bearings 10. Body 7 is likewise mounted by means of a bearing 11 and is displaceable in the direction of arrow P.

When the input shaft is driven, the body 7 will begin to rotate via contact of the push belt 9 with the first friction surface 5 and the third friction surface 12. Because body 7 rotates, it will in turn begin to rotate the output shaft 2 via contact of the fourth friction surface 13 with push belt 9 and the contact of push belt 9 with second friction surface 6.

By displacing the body 7 in the direction of arrow P the radial distance between input shaft 1 and the point of contact between the first friction surface 5 and push belt 9 can be varied. The distance between output shaft 2 and the associated point of contact of push belt 9 and second friction surface 6 can thus also be changed. By displacing the body 7 in the direction of arrow P the ratio between both stated distances can thus be changed, whereby a certain transmission ratio is created between input shaft 1 and output shaft 2.

Figure 2:
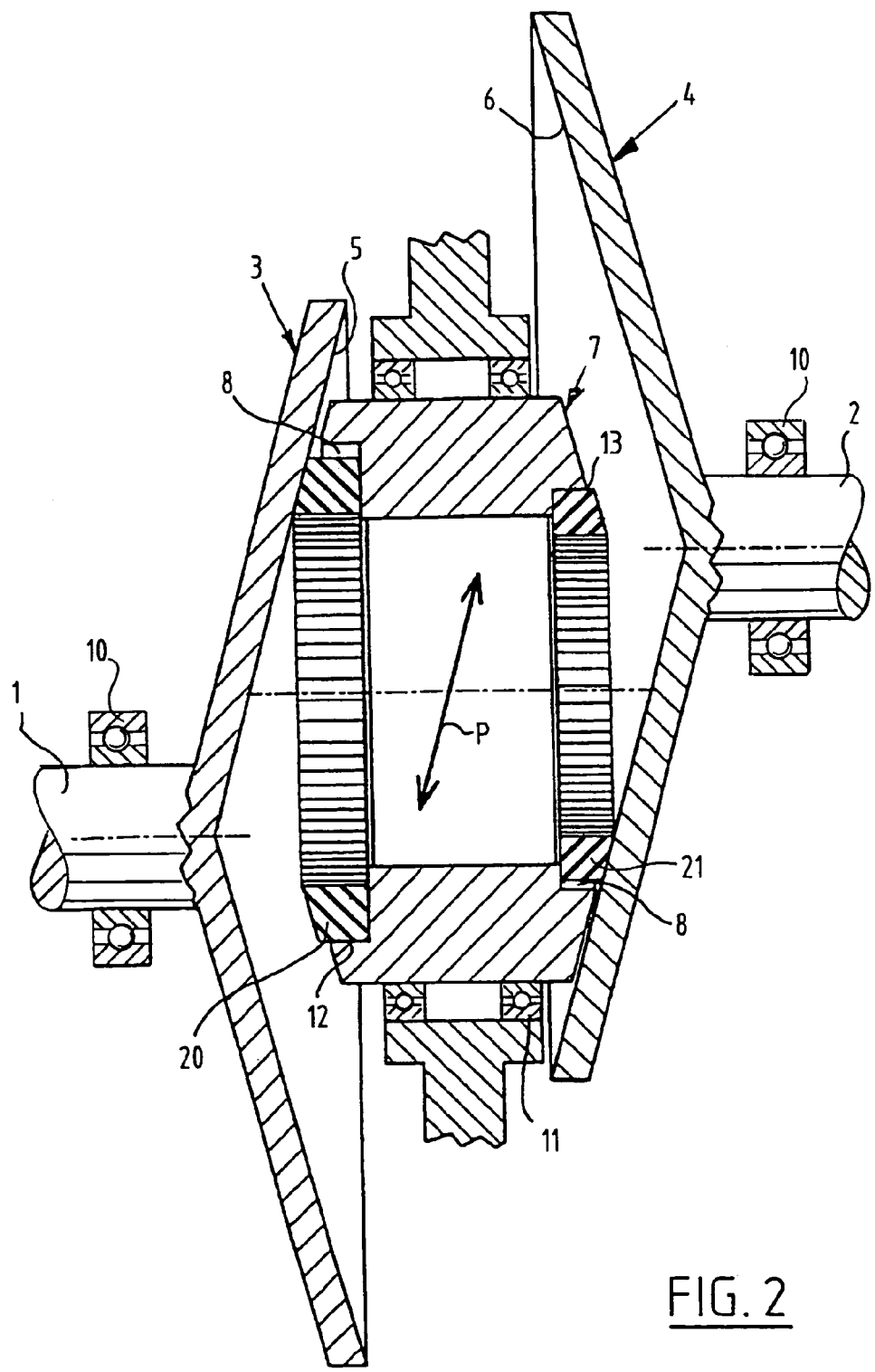
FIG. 2 shows schematically a second embodiment of a transmission according to the invention.

FIG. 2 shows a variation of the transmission shown in FIG. 1, corresponding components are designated with the same reference numerals and will not be elucidated any further hereinbelow.

The body 7, which is displaceable in the direction of arrow P, once again has on either side a wheel-shaped recess 8. In this embodiment however, these recesses 8 are not of equal diameter. Associated push belts 20 and 21 are placed in these two recesses of different diameter.

Through driving of input shaft 1 the push belt 20 will be driven via the first friction surface 5. This push belt 20 will then drive body 7 at a certain peripheral speed. Since the recess in which push belt 21 is placed has a smaller diameter in this embodiment, push belt 21 will be rotated at a lower peripheral speed than push belt 20, whereby output shaft 2 will likewise be driven at a speed other than shaft 1.

Figure 3:
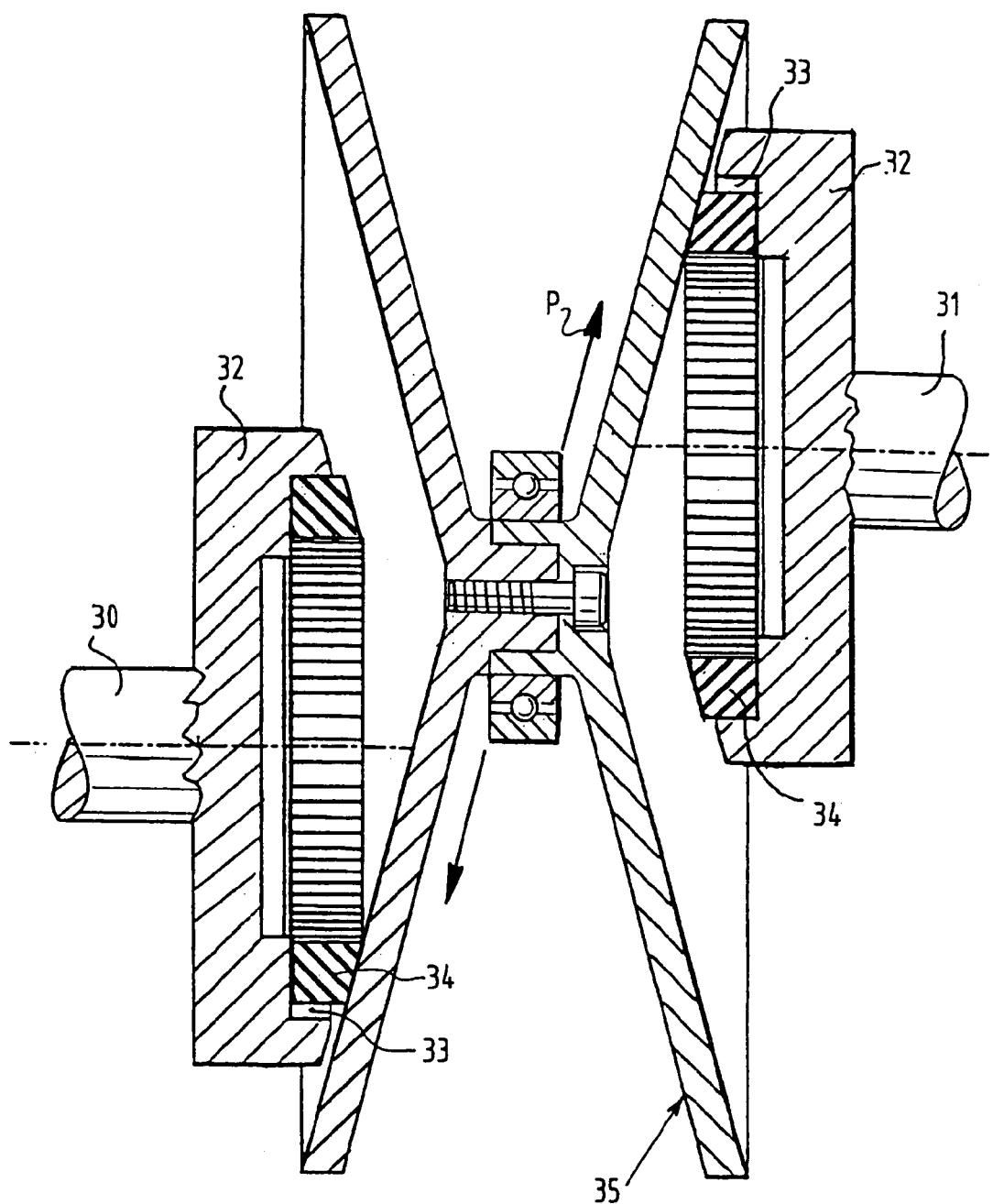
FIG. 3 shows a third embodiment of a transmission according to the invention.

FIG. 3 shows a third embodiment of the transmission according to the invention. This transmission has an input shaft 30 and an output shaft 31. The outer ends of both shafts 30, 31 are provided with a disc 32, each provided with a wheel-shaped recess 33. Push belts 34 are placed in these recesses 33.

Placed between input shaft 30 and output shaft 31 is a body 35 which has a diabolo-like cross-section. The transmission ratio between input shaft 30 and output shaft 31 can be varied by displacing body 35 in the direction of arrow P.

The friction surfaces of the bowl-shaped surfaces of wheels 3, 4 in the first two-embodiments and of the body 35 of diabolo-like cross-section can be of any desired form. In the case of surfaces of irregularly formed cross-section it may however be required for at least one of the shafts to be adjustable in axial direction, optionally under spring pressure, so that a sufficient pressing force of push belts 9, 34 remains ensured. As a consequence of the irregularly formed surfaces the displacing movement of body 7, 35 may herein be non-linear. This causes additional structural difficulties. If however the surfaces are conical surfaces with an equal apex angle, the displacing movement will be linear and in particular conditions it may even be unnecessary to make the shafts adjustable in axial direction.

Figure 4:
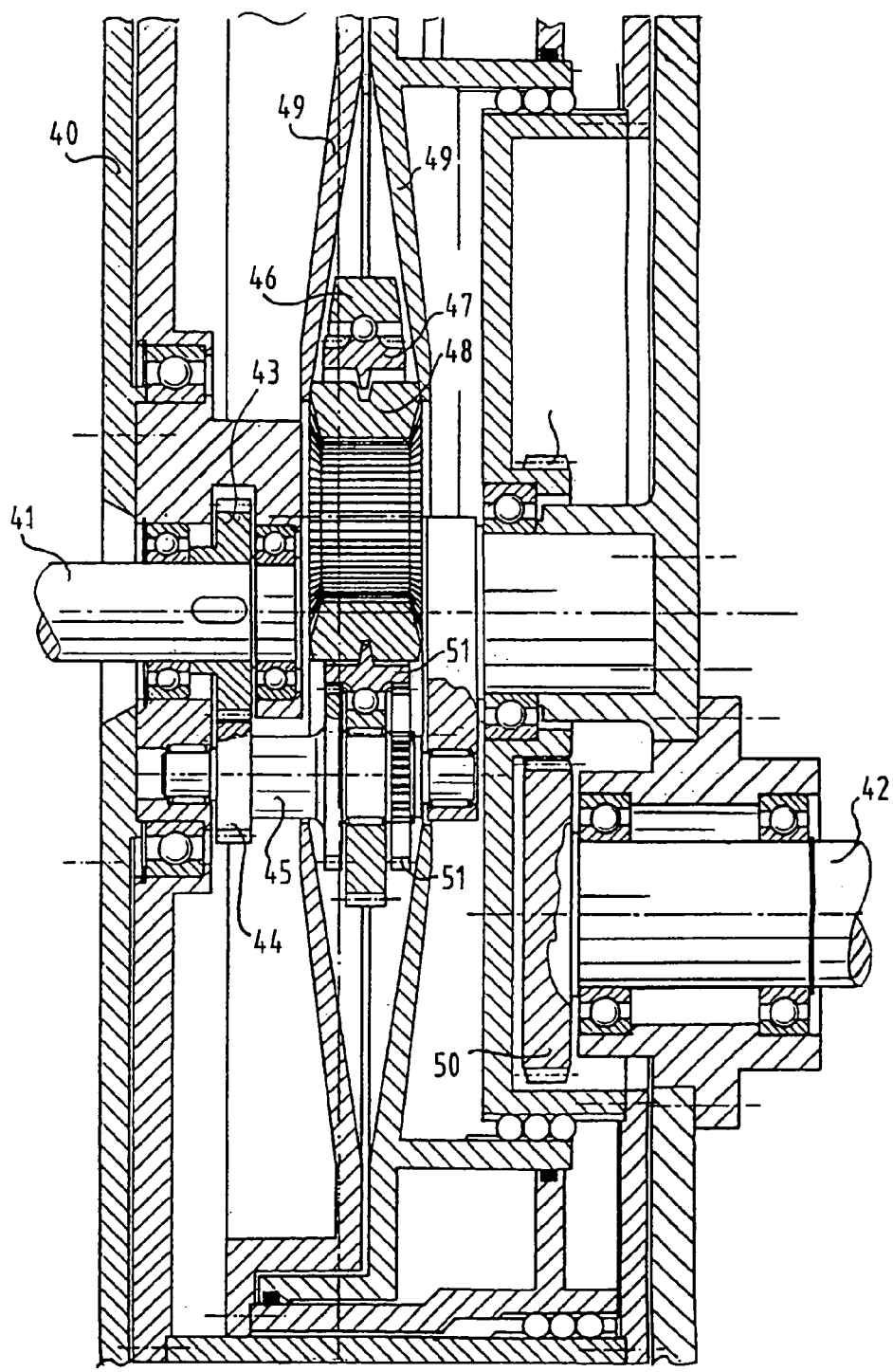
FIG. 4 shows a variant of the transmission according to the invention.

In FIG. 4 is shown a variant of a transmission according to the invention. This transmission comprises a housing 40 in which an input shaft 41 and an output shaft 42 are mounted. Via a toothed wheel 43 the input shaft 42 drives another toothed wheel 44, which in turn drives an auxiliary shaft 45. An arm 46 is mounted rotatably on this auxiliary shaft 45. Mounted in this arm 46 is a body 47 which shows similarities to the body 7, 35 of the foregoing embodiments. A single push belt 48 is accommodated in this body 47. Push belt 48 is in contact on both sides with dish-like parts 49 which are likewise mounted in housing 40. One of the dish-like parts 49 is connected via toothed wheels 50 to output shaft 42.

The distance between the central axis of dish-like parts 49 and the point of contact between these parts and push belt 48 can be varied by rotating the arm 46. It is essential herein that dish-like parts 49 can displace axially to provide sufficient space for the push belt. The parts 49 must therefore be under spring pressure here, so that an adequate pressure force on the push belt is ensured.

Through driving of body 47 by means of toothed wheels 51 a driving torque can be applied to dish-like parts 49 at different distances around the central axis. The transmission ratio between input shaft 41 and output shaft 42 can thus be varied by rotating the arm 46.

By embodying the body 47 the same as the body 7 of the first embodiment, the toothed wheel 51 can be arranged on the body between the push belts and the toothed wheel can have a diameter smaller than the diameter of the push belts.

In all the shown embodiments the body 7, 35, 47 is at least radially displaceable. Body 7, 35 is moreover axially displaceable herein, and the body 47 is tangentially displaceable, this in order to vary the position of the contact surfaces of the push belt(s).

This makes it possible, by driving the input shaft and by displacing the body, to adjust a determined transmission ratio between the input shaft and the output shaft.

Figure 5:
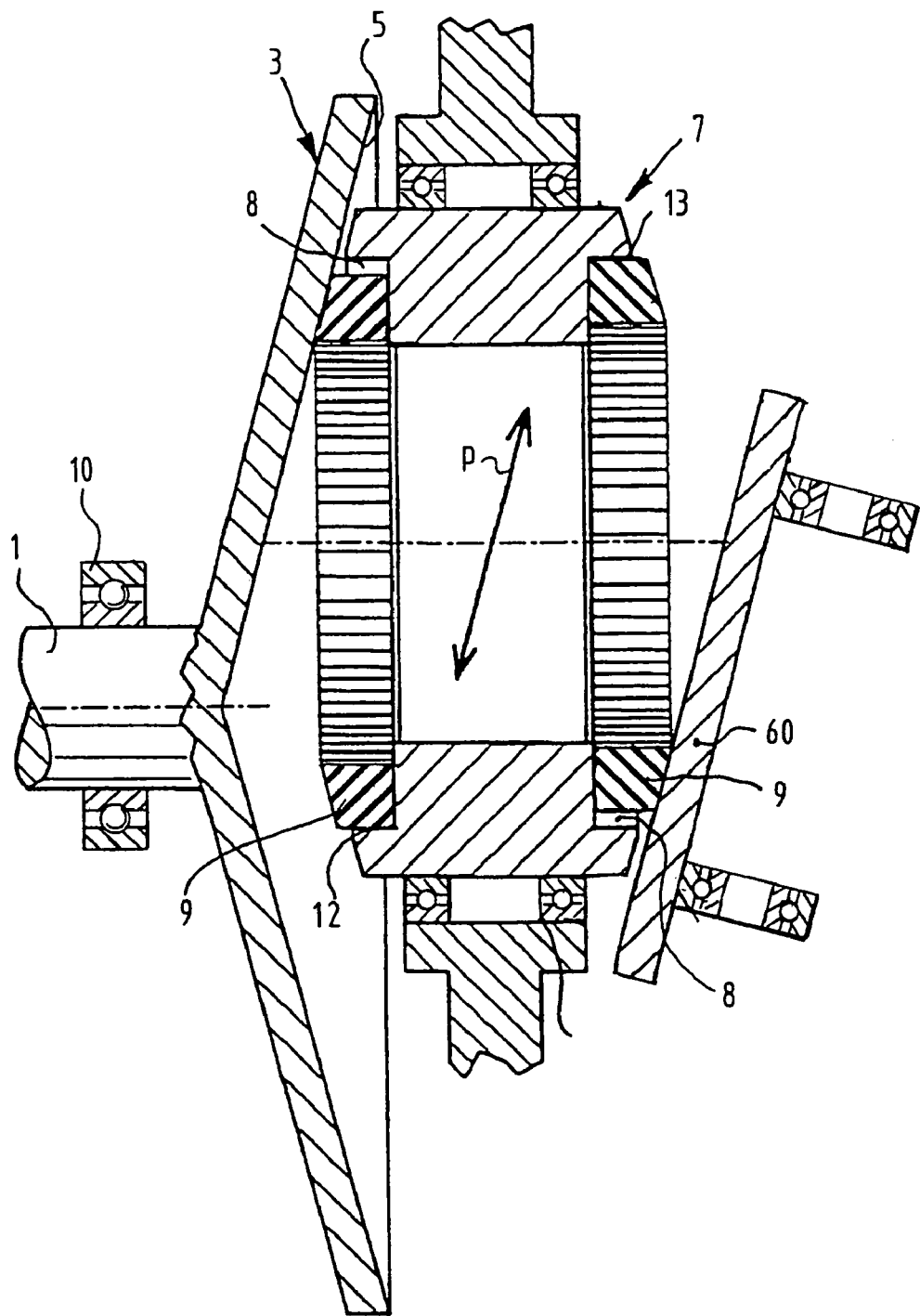
FIG. 5 shows a fourth embodiment according to the invention.

FIG. 5 shows an embodiment wherein, compared with the embodiment of FIG. 1, the output shaft is replaced by a translatably arranged strip 60. The translating movement is perpendicular to the plane of the drawing.

Figure 6:
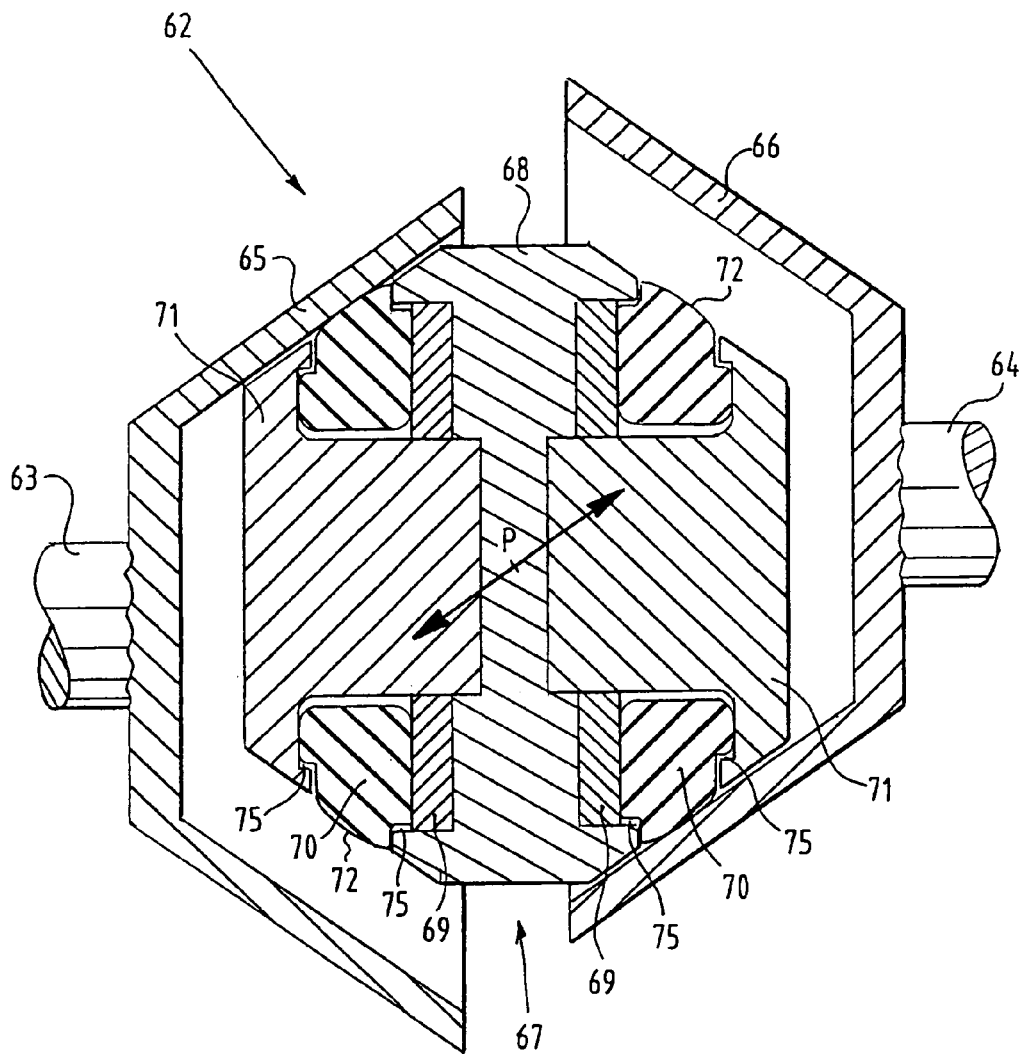
FIG. 6 shows a fifth embodiment according to the invention.

FIG. 6 shows a fifth embodiment 62 according to the invention. This embodiment 62 has an input shaft 63 and an output shaft 64. Both shafts each carry a friction wheel 65 respectively 66. A body 67 is arranged displaceably and rotatably between these friction wheels 65, 66. This body 67 consists of a basic part 68 comprising on either side a cylindrical friction surface 75. Dry-film lubricating discs 69 are placed in the two cylindrical recesses of basic part 68 to decrease friction. Further placed in the recesses are push belts 70 which lie against the friction surfaces 65, 66 on the one side and 75 on the other.

Push belt 70 is situated between basic body 68 and a stabilization part 71 which extends in radial direction as far as push belt 70. Also situated in the stabilization part is a cylindrical friction surface 75 which functions as running surface for the push belt over a part of the periphery. This stabilization part ensures that the push belt does not tilt, whereby the push belt is better loaded and whereby a greater power can be transmitted. The contact surface 72 of the push belt can also be curved, whereby better running properties of the transmission are obtained and whereby the efficiency of the transmission is increased.

In FIGS. 7a and 7b is shown a mechanical transmission 81 which comprises an input shaft 82 having thereon a friction surface 83, an output shaft 84 and a friction surface 85 arranged thereon. Between friction surfaces 83 and 85 is arranged a displaceable friction member 86 with which the transmission ratio between input shaft 82 and output shaft 84 can be adjusted.

Friction member 86 comprises a frame 87 which is displaceable. A bush 89 is mounted in this frame 87 via bearings 88. Bush 89 is provided on the inner side with a screw thread 90. Two bodies 92 and 93 are arranged in this screw thread by means of balls 91. Arranged between bodies 92 and 93 are cup springs 94 which urge the two bodies away from each other. It will be self-evident that the action of cup springs can also be brought about by for instance a spiral spring or a gas spring. Bodies 92 and 93 are provided on the sides directed toward the respective friction surfaces 83 and 85 with a push belt 95 respectively 96.

Cup springs 94 ensure that push belts 95, 96 are brought into contact with the respective friction surfaces 83 and 85. If a torque is now applied to shaft 82, the push belt 95, and therefore body 92, will be carried along by rotation of friction surface 83. Owing to the screw thread 90 the body 92 will now displace relative to bush 89 in the direction of friction surface 83. This will result in a certain pressing force of push belt 95 on friction surface 83. When the pressing force is sufficiently great, the bush 89 will be carried along by rotation of shaft 82.

Since in the first instance the output shaft 84 stands still, the body 93 will be held back due to friction between push belt 96 and friction surface 85. Because bush 89 rotates, the body 93 will now displace relative to this bush toward friction surface 85, so that the pressing force between push belt 96 and friction surface 85 increases. As soon as the pressing force is sufficiently great, output shaft 84 will begin to rotate and a torque of input shaft 82 can thus be transmitted onto output shaft 84.

Output shaft 84 is displaceable in the axial direction A. In bush 89 is arranged a securing member 97 which prevents the body 93 running out of the screw thread as a consequence of the cup springs 94 when output shaft 84 is moved away from friction member 86. FIG. 7a shows the disengaged position.

In FIG. 7b the output shaft 84 is once again placed against friction member 86, whereby body 93 is released from the securing member 97.

As shaft 84 moves back considerable slippage will occur between the steel friction surface 85 and push belt 96. This creates heat, which can be removed in simple manner with a coolant such as water.

Since the coefficients of friction of non-lubricated and lubricated contact surfaces are practically the same, sufficient power can be transmitted from the input shaft to the output shaft while the transmission can also be cooled.

Figure 8:
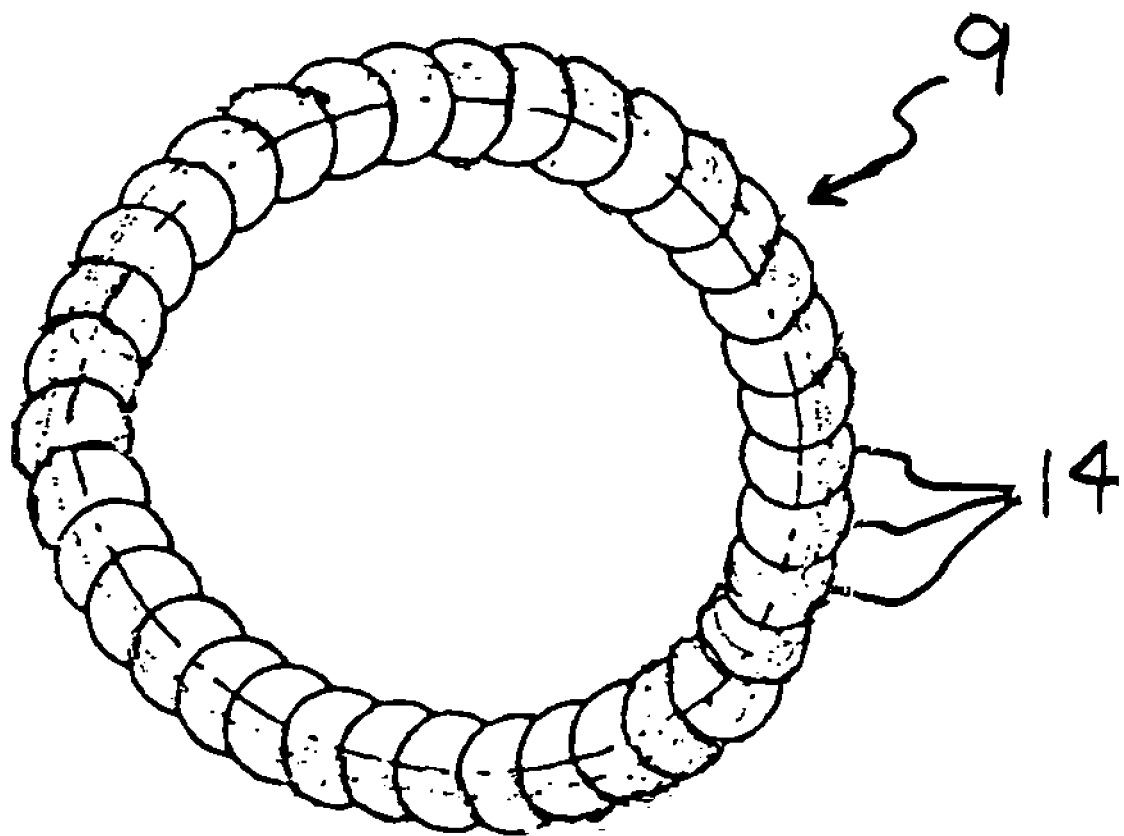
FIG. 8 shows a front view of a push belt having mutually abutting push links.

As illustrated in FIG. 8, the push belt 9 may be comprised of mutually abutting push links 14.

What is claimed is:

1. A mechanical transmission, comprising:
    a) a frame;
    b) an input shaft with a first friction surface, which shaft is arranged rotatably on the frame;
    c) an output shaft with a second friction surface arranged rotatably on the frame parallel to the input shaft;
    d) a rotatable body with a third friction surface and a fourth friction surface arranged at least for radial displacement on the frame between the input shaft and output shaft;
    e) a first push belt arranged between the first friction surface and the third friction surface and co-acting therewith; and
    f) a second push belt arranged between the second friction surface and the fourth friction surface and co-acting therewith,
    wherein the friction surfaces are symmetrical, the friction surfaces include at least an axial force component and at least one of the first friction surface and the third friction surface and at least one of the second friction surface and the fourth friction surface include a radial directional force component.

2. The transmission as claimed in claim 1, wherein the input shaft and output shaft each include a wheel with a conical surface opening toward the body such that the conical surfaces form respectively the first friction surface and the second friction surface, and that the body includes on either side two wheel-shaped recesses coaxial to the rotation axis such that cylindrical surfaces of said wheel-shaped recesses form respectively the third friction surface and the fourth friction surface.

3. The transmission as claimed in claim 2, wherein the diameters of both wheel-shaped recesses differ from each other.

4. The transmission as claimed in claim 2, further including a stabilization part arranged in the wheel-shaped recess, which part extends in radial direction as far as the push belt arranged in the recess.

5. The transmission as claimed in claim 3, further including a stabilization part arranged in the wheel-shaped recess, which part extends in radial direction as far as the push belt arranged in the recess.

6. The transmission as claimed in claim 1, wherein the input shaft and the output shaft each include a wheel with a coaxial wheel-shaped recess such that the cylindrical surfaces of the wheel-shaped recesses form respectively the first friction surface and the second friction surface, and that the body includes on either side a conical surface such that the two conical surfaces form respectively the third friction surface and the fourth friction surface.

7. The transmission as claimed in claim 6, wherein the diameters of both wheel-shaped recesses differ from each other.

8. The transmission as claimed in claim 7, further including a stabilization part arranged in the wheel-shaped recess, which part extends in radial direction as far as the push belt arranged in the recess.

9. The transmission as claimed in claim 1, wherein the push belt includes a number of mutually abutting push links.

10. The transmission as claimed in claim 1, wherein the push belt is a flexible belt.

11. The transmission as claimed in claim 1, wherein the first friction surface and the second friction surface are identical and the third friction surface and the fourth friction surface are identical.

12. A mechanical transmission, comprising:
  a) a frame;
  b) an input shaft with a first friction surface, which shaft is arranged rotatably on the frame;
  c) a translatably arranged body with a second friction surface;
  d) a rotatable body with a third friction surface and a fourth friction surface arranged at least for radial displacement on the frame between the input shaft and the translatable body;
  e) a first push belt arranged between the first friction surface and the third friction surface and co-acting therewith; and
  f) a second push belt arranged between the second friction surface and the fourth friction surface and co-acting therewith,
  wherein the first, third and fourth friction surfaces are symmetrical, the friction surfaces include at least an axial force component and at least one of the first friction surface and the third friction surface and at least one of the second friction surface and the fourth friction surface include a radial directional force component.

13. The transmission as claimed in claim 12, wherein at least one of the push belts is manufactured from stainless steel material, hard material or ceramic material.

14. The transmission as claimed in claim 13, wherein the friction surface associated with the at least one push belt is a steel surface.

15. The transmission as claimed in claim 14, further including cooling means for cooling at least one push belt with a cooling liquid such as water.

16. The transmission as claimed in claim 13, further including cooling means for cooling at least one push belt with a cooling liquid such as water.

* * * * *